United States Patent
O'Dell-Alexander

(10) Patent No.: US 8,413,040 B2
(45) Date of Patent: Apr. 2, 2013

(54) CREATING AND INSERTING LINKS BY DRAG AND DROP

(75) Inventor: Brendyn O'Dell-Alexander, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 591 days.

(21) Appl. No.: 12/370,610

(22) Filed: Feb. 13, 2009

(65) Prior Publication Data

US 2010/0211860 A1 Aug. 19, 2010

(51) Int. Cl.
*G06F 17/00* (2006.01)
*G06F 3/048* (2006.01)

(52) U.S. Cl. ........ 715/205; 715/206; 715/208; 715/255; 715/256; 715/764; 715/769

(58) Field of Classification Search .................. 715/205, 715/206, 208, 764, 769
See application file for complete search history.

(56) References Cited

U.S. PATENT DOCUMENTS

| | | | |
|---|---|---|---|
| 5,634,095 A | 5/1997 | Wang et al. | |
| 5,668,964 A | 9/1997 | Helsel et al. | |
| 5,689,664 A * | 11/1997 | Narayanan et al. | 715/769 |
| 5,724,595 A | 3/1998 | Gentner | |
| 6,097,391 A | 8/2000 | Wilcox | |
| 2005/0120299 A1* | 6/2005 | Murray et al. | 715/513 |
| 2006/0212790 A1* | 9/2006 | Perantatos et al. | 715/501.1 |
| 2006/0242164 A1* | 10/2006 | Evans et al. | 707/100 |
| 2007/0143339 A1* | 6/2007 | Springett | 707/103 R |
| 2008/0115069 A1 | 5/2008 | Veselova | |
| 2008/0177708 A1* | 7/2008 | Ayyar et al. | 707/3 |
| 2008/0184141 A1* | 7/2008 | Selig | 715/762 |
| 2009/0113282 A1* | 4/2009 | Schultz et al. | 715/208 |

OTHER PUBLICATIONS

Scott Mattlocks, Pro PHP-GTK, 2006, Apress, pp. 269-279 "Drag-and-Drop".*
Rekimoto, Jun., "Pick-and-Drop: A Direct Manipulation Technique for Multiple Computer Environments", Proceedings of the 10th annual ACM symposium on User interface software and technology, retrieved at <<http://ftp.csl.sony.co.jp/person/rekimoto/papers/uist97.pdf>>, Oct. 15, 2007, pp. 1-8.
Carter, et al., "Peachpit", "Using OneNote with Office", retrieved at <<http://www.peachpitcom/articles/article.aspx?p=169472>>, Nov. 12, 2008, pp. 1-10.
"Drag and Drop", retrieved at <<http://oldude59.wordpress.com/2007/12/13/drag-and-drop/>>, Nov. 12, 2008, pp. 1-9.
"It's a Drag: The Power of Drag and Drop in Safari", retrieved at <<http://macmembrane.com/its-a-drag-the-power-of-drag-and-drop-in-safari/>>, Nov. 12, 2008, pp. 1-9.
"The Mayfield Handbook of Technical & Scientific Writing", "Creating a Link: How to Insert a Reference Link into a Word Processing Document", retrieved at <<http://www.mhhe.com/mayfieldpub/tsw/c-link.htm>>, Nov. 14, 2008, pp. 1-2.

* cited by examiner

*Primary Examiner* — Chau Nguyen
(74) *Attorney, Agent, or Firm* — Hope Baldauff Hartman, LLC

(57) ABSTRACT

A user interface is provided. The user interface may include a first portion and a second portion. The first portion may contain one or more listings corresponding to one or more entities. The second portion may include an editable surface for viewing and editing the entities. A command to drag and drop a listing corresponding to a first entity from the first portion displaying the listing into the second portion displaying a second entity is received. In response to receiving the command to drag and drop the listing from the first portion into the second portion, a link to the first entity is inserted into the second entity.

19 Claims, 8 Drawing Sheets

CREATING AND INSERTING LINKS BY DRAG AND DROP

BACKGROUND

The creation of hyperlinks and other types of links within application programs can be a difficult and tedious task with a significant learning curve. In a typical example, a user may desire to insert a hyperlink to a source document into a target document. In order to insert the hyperlink into the target document, the user may perform the following steps: (1) enter text (i.e., anchor text) to be associated with a uniform resource locator ("URL"); (2) highlight the anchor text using a mouse or other pointing device; (4) access a hyperlink insertion tool that enables the user to enter a URL; (5) obtain the URL for the source document; (6) copy the URL; and (7) paste the URL into the hyperlink insertion tool.

At the completion of these steps, the hyperlink insertion tool may insert the hyperlink into the target document. The source document may then be accessed by selecting the hyperlink. In another implementation, the user may enter the anchor text into the hyperlink insertion tool as an alternative to steps (1) and (2). The need for a user to enter anchor text, obtain URLs, copy and paste the URLs, and access the link insertion tool creates complexity, thereby increasing the amount of time utilized to create and insert links.

It is with respect to these considerations and others that the disclosure made herein is presented.

SUMMARY

Technologies are described herein for creating and inserting links by drag and drop. The technologies may be implemented on existing, current, and future navigation mechanisms to facilitate the simplified creation and insertion of links within a document using a "drag and drop mechanism". As used herein, "drag and drop" generally refers to an operation of an input/output ("I/O") device, such as a mouse or other suitable pointing device, whereby an object is selected from a source, "dragged" from the source, and "dropped" in a destination. The source and the destination may be within the same entity or between different entities. As used herein, an "entity" may refer to a collection of information, such as pages, slides, sections, and the like, capable of being accessed via a link, such as a hyperlink. Further, the source and the destination may be within the same application program or between different application programs.

An example user interface suitable for implementing the technologies described herein may include a navigation pane and an edit pane. The user interface may be provided by any application program including, but not limited to, a word processing application, a presentation application, or a note-taking application. The navigation pane may include a list of selectable entities. In this example, the list of selectable entities includes at least a first entity and a second entity. When a user selects the first entity from the navigation pane, the first entity may be displayed in the edit pane. The edit pane may enable a user to view and edit the first entity.

In order to insert a link to the second entity into the first entity, the user can drag and drop the listing of the second entity from the navigation pane into the edit pane. In particular, the user may drag a graphical representation of the second entity from the navigation pane and drop the graphical representation into the edit pane at a specific location in the first entity. The edit pane then refreshes its display of the first entity to show the link to the second entity.

According to one embodiment, a user interface is provided herein for creating and inserting hyperlinks. The user interface may include a first portion and a second portion. The first portion may contain one or more listings corresponding to one or more entities. The second portion may include an editable surface for viewing and editing the entities. A command to drag and drop a listing corresponding to a first entity from the first portion displaying the listing into the second portion displaying a second entity is received. A link to the first entity is inserted into the second entity, in response to receiving the command to drag and drop the listing from the first portion into the second portion.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for creating and inserting links by drag and drop. Through the utilization of the technologies and concepts presented herein, a user interface is provided enabling a user to create and insert links by dragging a representation of an entity from a source and dropping the representation at a specific location. Once the representation is dropped, the user interface creates and inserts a link to the entity at the specific location.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1A:
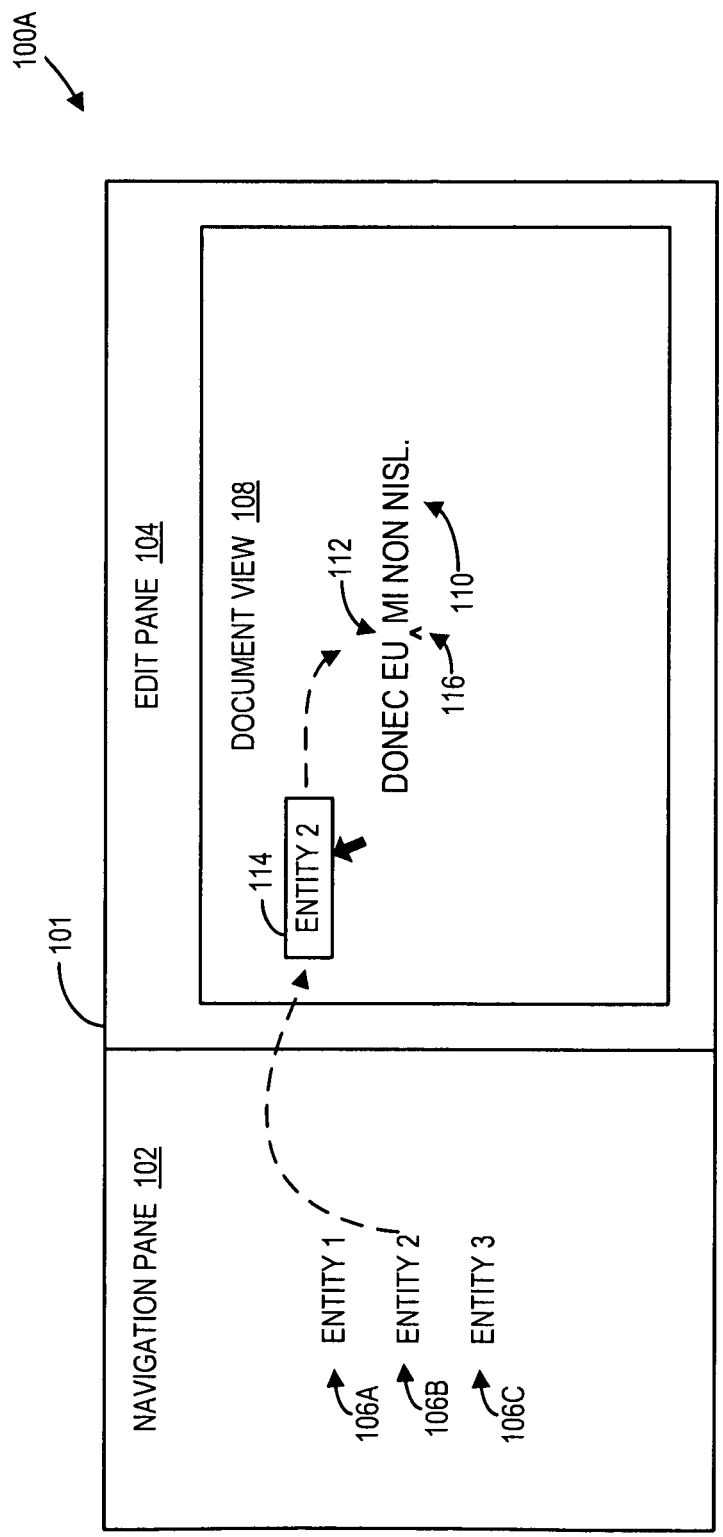
FIGS. 1A-1B are screen display diagrams showing an illustrative user interface operative to facilitate the creation and insertion of links by drag and drop, in accordance with embodiments.
Figure 1B:
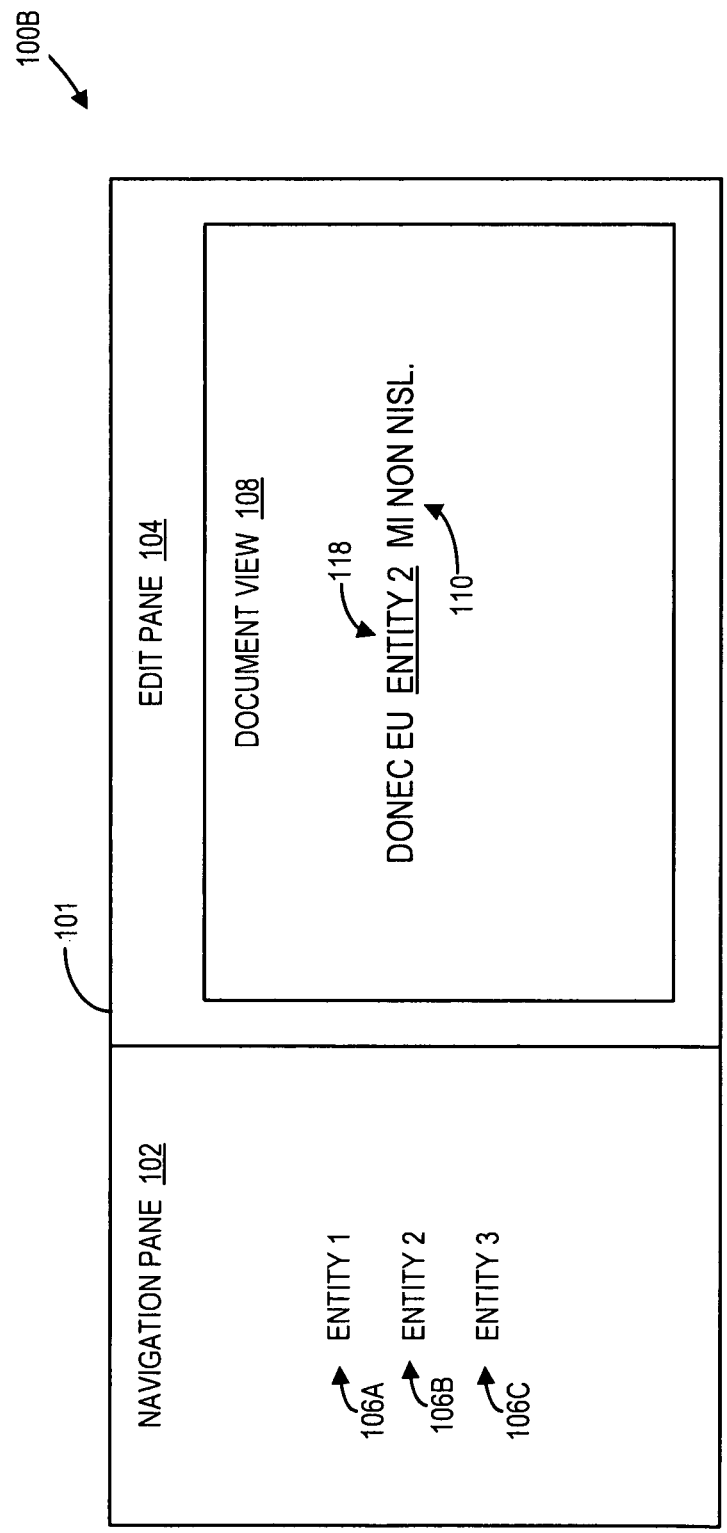

In the following detailed description, references are made to the accompanying drawings that form a part hereof, and which are showing by way of illustration specific embodiments or examples. Referring now to the drawings, in which like numerals represent like elements through the several figures, concepts and technologies for creating and inserting links by drag and drop will be described. FIGS. 1A-1B are screen display diagrams 100A-100B showing an illustrative user interface 101 operative to facilitate the creation and insertion of links by drag and drop, in accordance with embodiments. FIG. 1A illustrates one view of the user interface 101 during the drag and drop operation. The user interface 101 includes a navigation pane 102 and an edit pane 104. The navigation pane 102 displays a first listing 106A, a second listing 106B, and a third listing 106C (collectively referred to as listings 106).

According to embodiments, the listings 106 each correspond to a particular entity. In the example illustrated in FIGS. 1A-1B, the first listing 106A corresponds to a first entity, the second listing 106B corresponds to a second entity, and the third listing 106C corresponds to a third entity. The listings 106 may be displayed as any suitable multimedia, such as text or images, identifying a corresponding entity. An entity may refer to an organization of information. In one example, a note-taking application may organize information according to pages. In this case, the listings 106 may display titles of the pages. In another example, a presentation application may organize information according to slides. In this case, the listings 106 may display titles of the slides or thumbnail images of the slides. In yet another example, a word processing application may organize information in a single document according to various sections. In this case, the listings 106 may display titles of sections in an outline view.

According to embodiments, the listings 106 in the navigation pane 102 may be selectable via a mouse or other pointing device to view the corresponding entity in the edit pane 104. As illustrated in FIG. 1A, in response to a user selecting the first listing 106A, the edit pane 104 provides a document view 108 of the corresponding first entity. The document view 108 may display the first entity in a suitable format where the user can view and edit the first entity. If the first entity is a page, then the edit pane 104 may display the page on a page editing surface. If the first entity is a slide, then the edit pane 104 may display the slide on a slide editing surface. If the first entity is a section within a document, then the edit pane 104 may jump to the selected section within a document editing surface.

It should be appreciated that pages and slides may represent independent entities, whereas sections may represent portions within a single entity, according to some embodiments. Thus, the listings 106 are capable of providing access to particular documents as well as to specified portions of a given document. If the listings 106 identify particular documents, then selecting one of the listings 106 may cause the edit pane 104 to display the selected document. If the listings 106 identify portions of a single document, then selecting one of the listings 106 may cause the edit pane 104 to jump to the selected portion of the document.

As illustrated in FIG. 1A, the first entity displayed in the document view 108 includes text 110 stating "Donec eu mi non nisl". The user may then decide to insert a link to the second entity between the words "eu" and "mi" at location 112. According to embodiments, the user may select the second listing 106B representing the second entity using a mouse or other pointing device. The user may then initiate a drag operation by pressing a button on the pointing device and while holding down the button, moving the pointing device away from the second listing 106B. Upon the user initiating the drag operation, the user interface 101 may display a dragging visualization 114 showing a graphical representation of the second listing 106B.

The user may continue to drag the dragging visualization 114 from the navigation pane 102 into the edit pane 104. As the dragging visualization 114 passes over the text 110, the user interface 101 may display an insertion pointer 116 showing where a link will be inserted once the dragging visualization 114 is dropped. In this way, the user can precisely identify where to insert a link. In the example illustrated in FIG. 1A, the user drops the dragging visualization 114 at the location 112 as indicated by the insertion pointer 116.

Turning now to FIG. 1B, a screen display diagram 100B will be described that illustrates the user interface 101 after the dragging visualization 114 is dropped into the text 110. As illustrated in FIG. 1B, the user interface 101 inserts a link 118 between the words "eu" and "mi" in the text 110 in response to the user dropping the dragging visualization 114. A user can select the link 118 in order to view the second entity. After the user completes editing the text 110, the first entity shown in the document view 108 may be saved and/or transmitted according to the particular application program implementing the user interface 101.

Although not so limited, the link 118 is illustrated as a conventional hyperlink containing underlined anchor text. Underlying the link 118 is a uniform resource locator ("URL") or other locating mechanism for identifying the location of an entity. In other embodiments, other multimedia, such as images, may be utilized instead of the anchor text. For example, if the listings 106 correspond to slides in a presentation program, then links to the slides may be thumbnail images of the slides. The multimedia, the locating mechanism, and any other information used to create a link may be contained in metadata associated with the given entity. The metadata may be stored in the same file as the given entity or in a separate file. For example, the anchor text and the URL for creating the link 118 may be contained in metadata stored in the same file as the second entity or in a separate file.

It should be appreciated that the embodiments described herein may be implemented on any application program that provides a user interface having a source containing representations of entities and a destination in which to edit a document. Further, the embodiments described herein may also be implemented on existing user interfaces having a similar configuration. The embodiments may provide drag and drop functionality for dragging a representation of an entity from the source and dropping representation into the document at the destination. Once the representation is dropped at a location within the document, a link to the corresponding entity is automatically created and inserted at the location. In this way, the embodiments may replace more tedious, conventional approaches for creating and inserting links.

Turning now to FIGS. 2A-2D, illustrative screen display diagrams 200A-200D, respectively, from an example note-taking application are shown. The screen display diagrams 200A-200D illustrate a sequence of operations whereby a link is created and inserted into a document by drag and drop. As previously described, the embodiments described herein may be implemented for any application program including, but not limited to, word processing applications, presentation applications, and note-taking applications. In this regard, while the screen display diagrams 200A-200D illustrate a note-taking application, the screen display diagrams 200A-200D are merely examples and are not intended to be limiting.

Figure 2A:
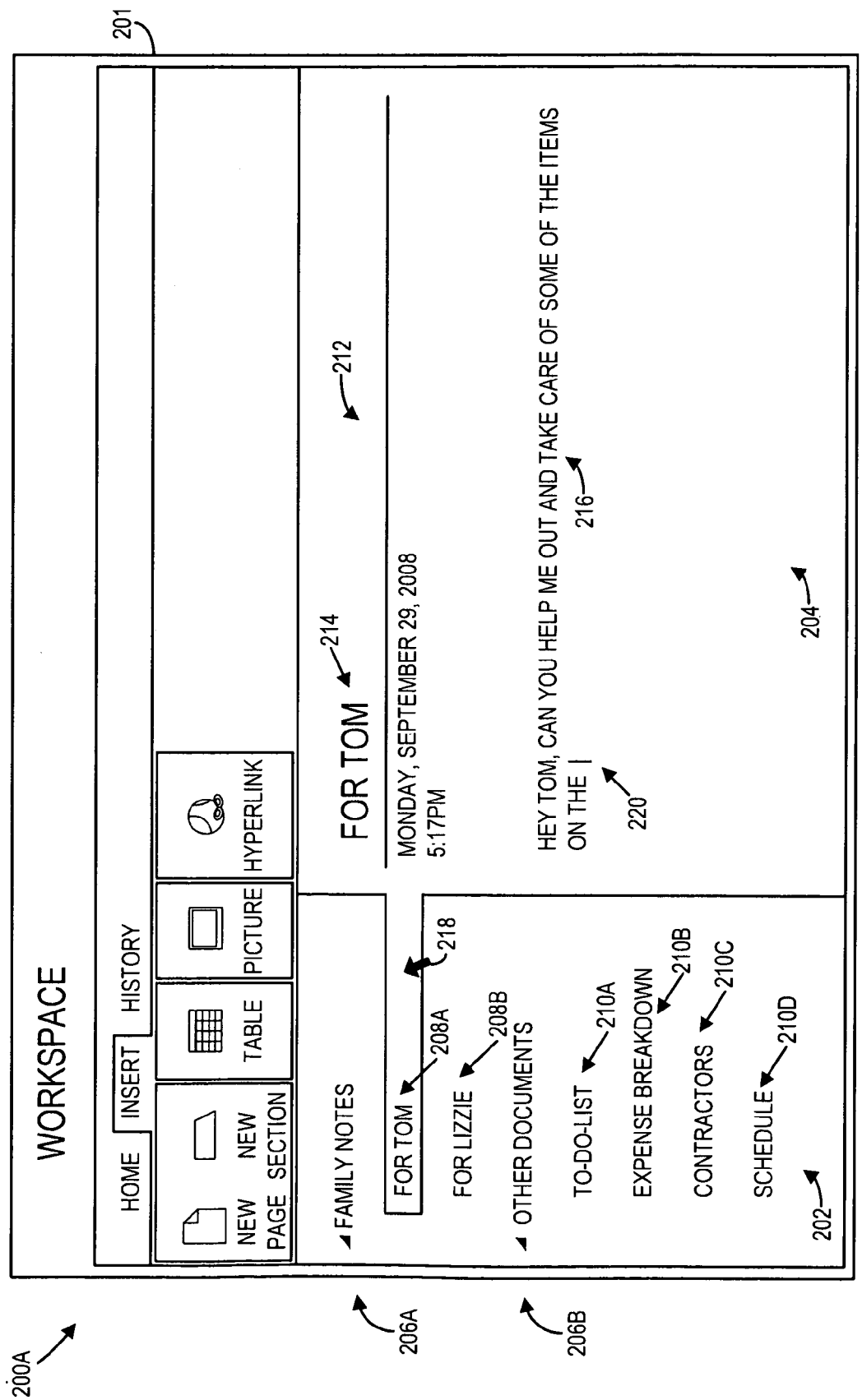
FIGS. 2A-2D are screen display diagrams showing an illustrative user interface from a note-taking application, the user interface being operative to facilitate the creation and insertion of links by drag and drop, in accordance with embodiments.

In FIG. 2A, a screen display diagram 200A will be described that illustrates one view of the user interface 201 containing a note-taking workspace associated with a given user (hereinafter referred to as the "primary user"). The user interface 201 includes a navigation pane 202 and an edit pane 204. The navigation pane 202 includes a first section 206A and a second section 206B, which are identified by small black arrows. Below the first section 206A and the second section 206B are individual pages. For example, the first section 206 includes a "For Tom" page 208A and a "For Lizzie" page 208B. In one embodiment, the "For Tom" page 208A may be accessed by the primary user to send a note to a user named Tom, while the "For Lizzie" page 208B may be accessed by the primary user to send a note to a user named Lizzie. In this example, Tom and Lizzie are part of the primary user's workspace and are illustrated as family members of the primary user.

The second section 206B contains a page listing showing various pages associated with the primary user. The second section 206B includes a first page 210A, a second page 210B, a third page 210C, and a fourth page 210D. As illustrated in FIG. 2A, the first page 210A corresponds to a to-do-list. The second page 210B corresponds to an expense breakdown. The third page 210C corresponds to a contractor statement. The fourth page 210D corresponds to a schedule. It should be appreciated that the use of pages in FIG. 2A is merely illustrative, and other types of entities (e.g., documents, presentation slides, sections, etc.) may be similarly displayed.

In the example illustrated in FIG. 2A, the primary user has selected the "For Tom" page 208A via a mouse or other pointing device as indicated by a cursor 218. In response to the primary user selecting the "For Tom" page 208A in the navigation pane 202, the edit pane 204 displays a message 212 directed at the user, Tom, as indicated at 214. The message 212 may be empty when it is first displayed in the edit pane 204. The primary user may then enter text 216 into the message 212. In the illustrative example, the primary user decides to insert a link to the first page 210A at the end of the text 216 identified by a blinking text cursor 220.

Figure 2B:
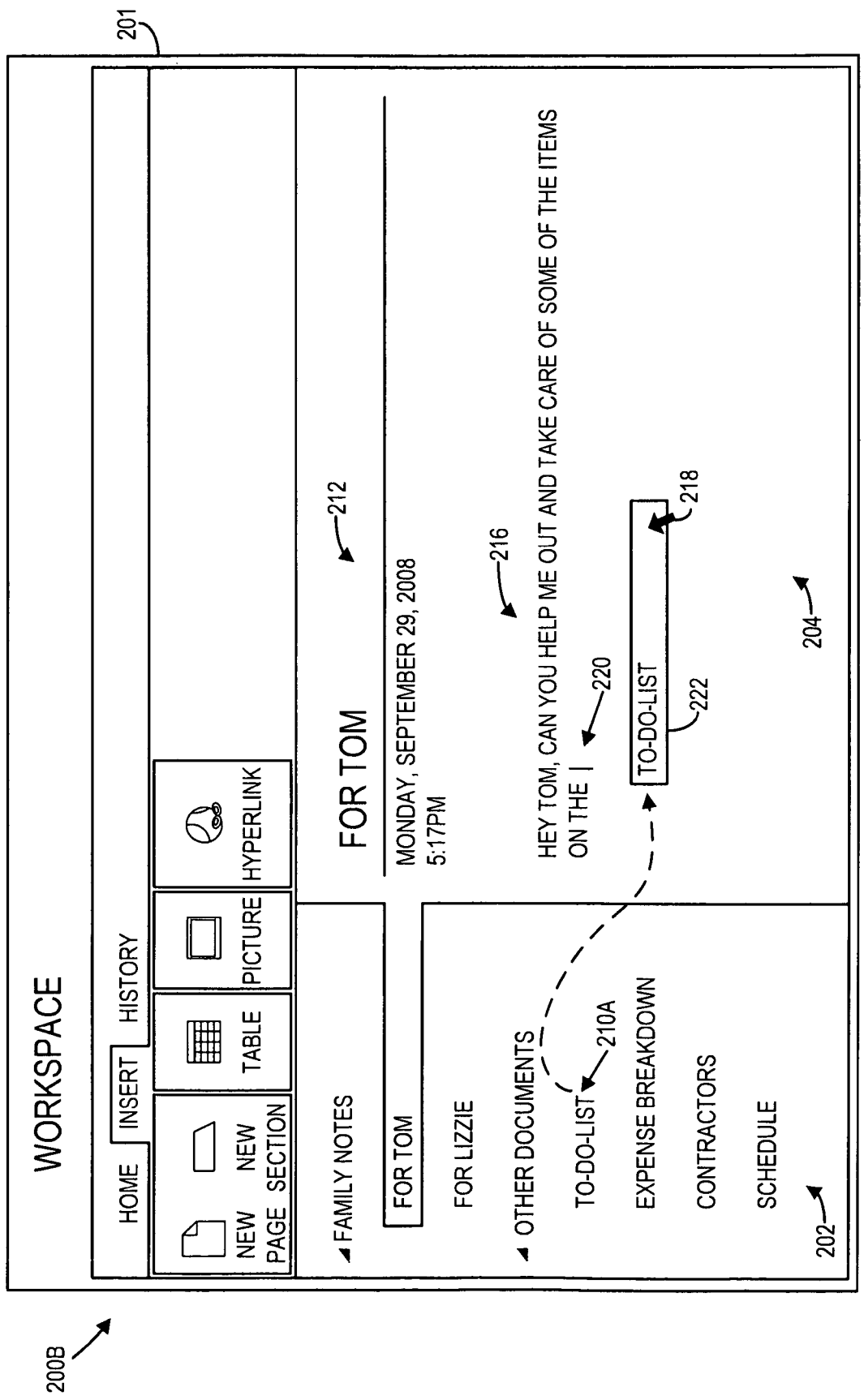

Turning now to FIG. 2B, a screen display diagram 200B will be described that illustrates another view of the user interface 201 at the beginning of a drag and drop operation. In the illustrative example, the primary user selects the first page 210A from the navigation pane 202 and drags the cursor 218 away from the first page 210A, and the user interface 201 displays a dragging visualization 222 of the first page 210A. The dragging visualization 222 enables the primary user to verify that the proper listing has been selected from the navigation pane 202. The dragging visualization 222 may be attached to the cursor 218 as it is being dragged. In this way, the dragging visualization 222 will follow where the cursor 218 moves, providing a one-to-one correspondence with the movements of the primary user's pointing device.

As the primary user drags the dragging visualization 222 towards the edit pane 204, the primary user may drop the dragging visualization 222 at any location within the text 216 or at other portions of the document. For example, the primary user may drop the dragging visualization at or near the blinking text cursor 220. In one embodiment, the user interface 201 includes an insertion pointer, such as the insertion pointer 116 illustrated in FIGS. 1A-1B, showing the exact point where the dragging visualization 222 is dropped, and thus, where the corresponding link is inserted.

Figure 2C:
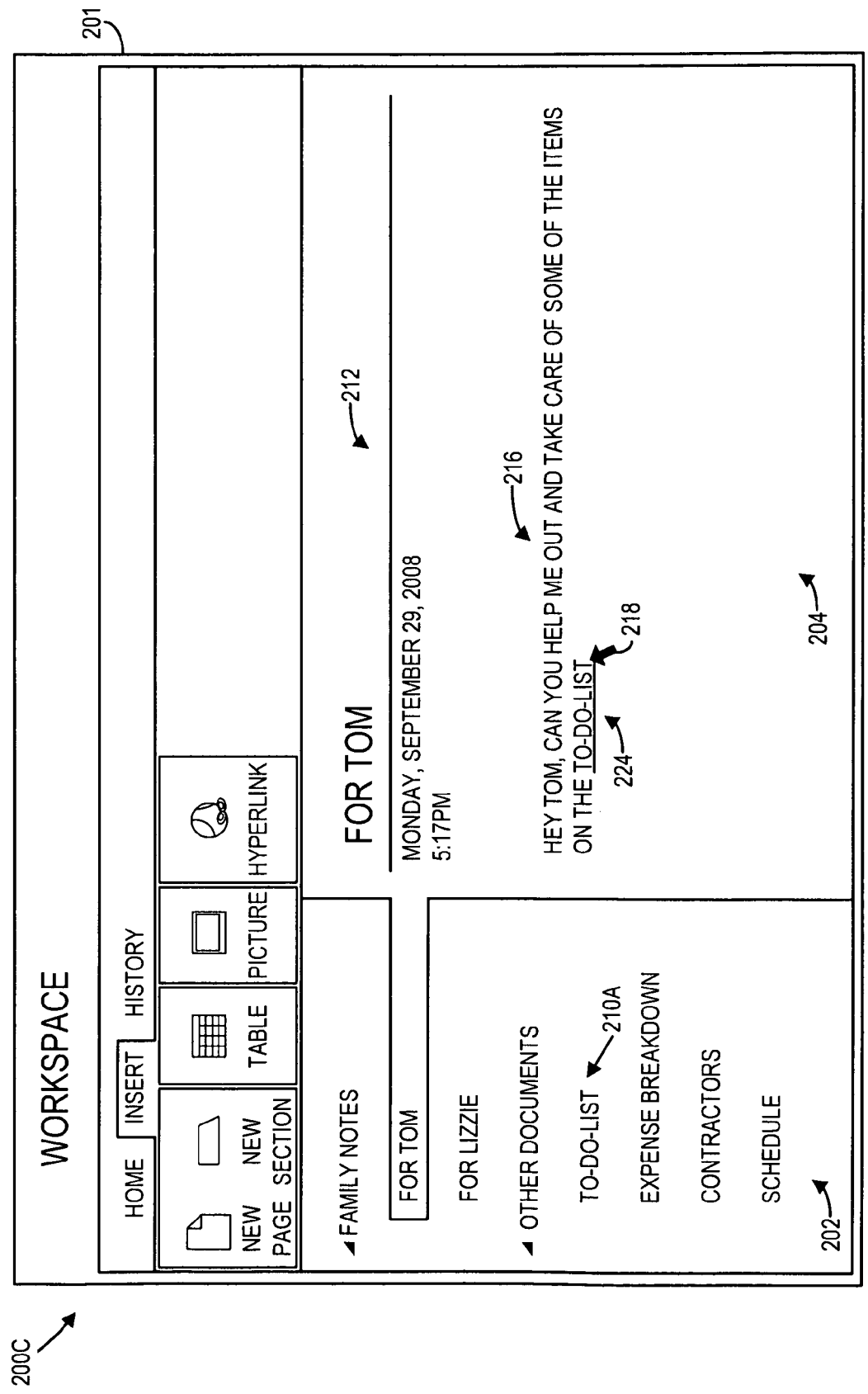

Turning now to FIG. 2C, a screen display diagram 200C will be described that illustrates another view of the user interface 201 at the ending of the drag and drop operation. In FIG. 2B, when the primary user drops the dragging visualization 222 within the edit pane 204, the user interface 201 inserts a link 224 at the end of the text 216, as illustrated in FIG. 2C. In one embodiment, the user interface 201 inserts a predefined anchor text or an image representation into the link 224. In another embodiment, the user interface 201 provides a tool enabling the primary user to enter anchor text. As illustrated in FIG. 2C, the user interface 201 inserts the predefined anchor text, "TO-DO-LIST", which matches the text of the first page 210A.

Figure 2D:
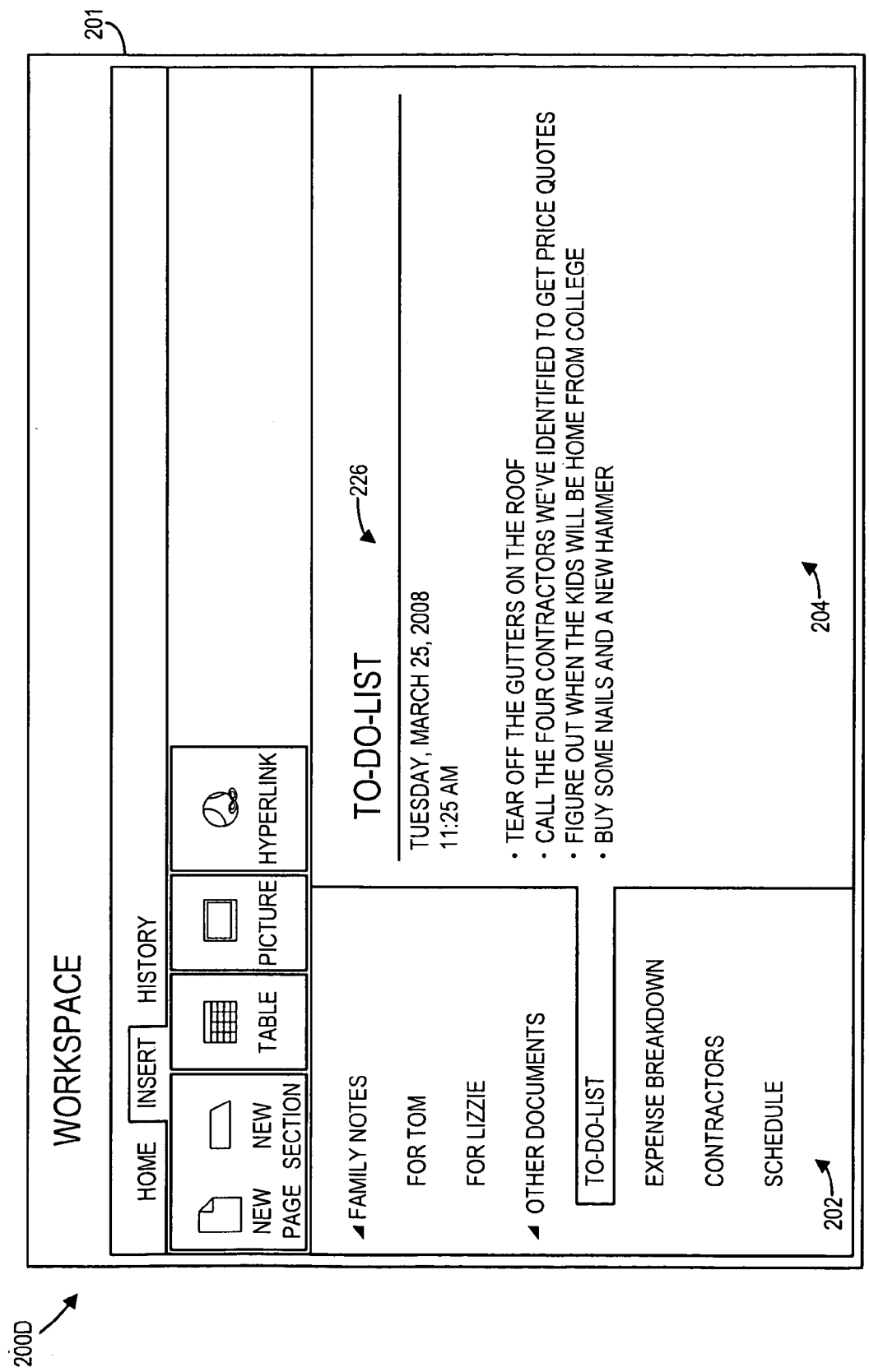

Turning now to FIG. 2D, a screen display diagram 200D will be described that illustrates another view of the user interface 201 while implementing the functionality of the link 224. Upon having the link 224 inserted into the text 216, the primary user may select the link 224 to test its functionality. Once the primary user has selected the link 224, the user interface 201 displays a To-Do-List 226 in the edit pane 204, as illustrated in FIG. 2D.

Figure 3:
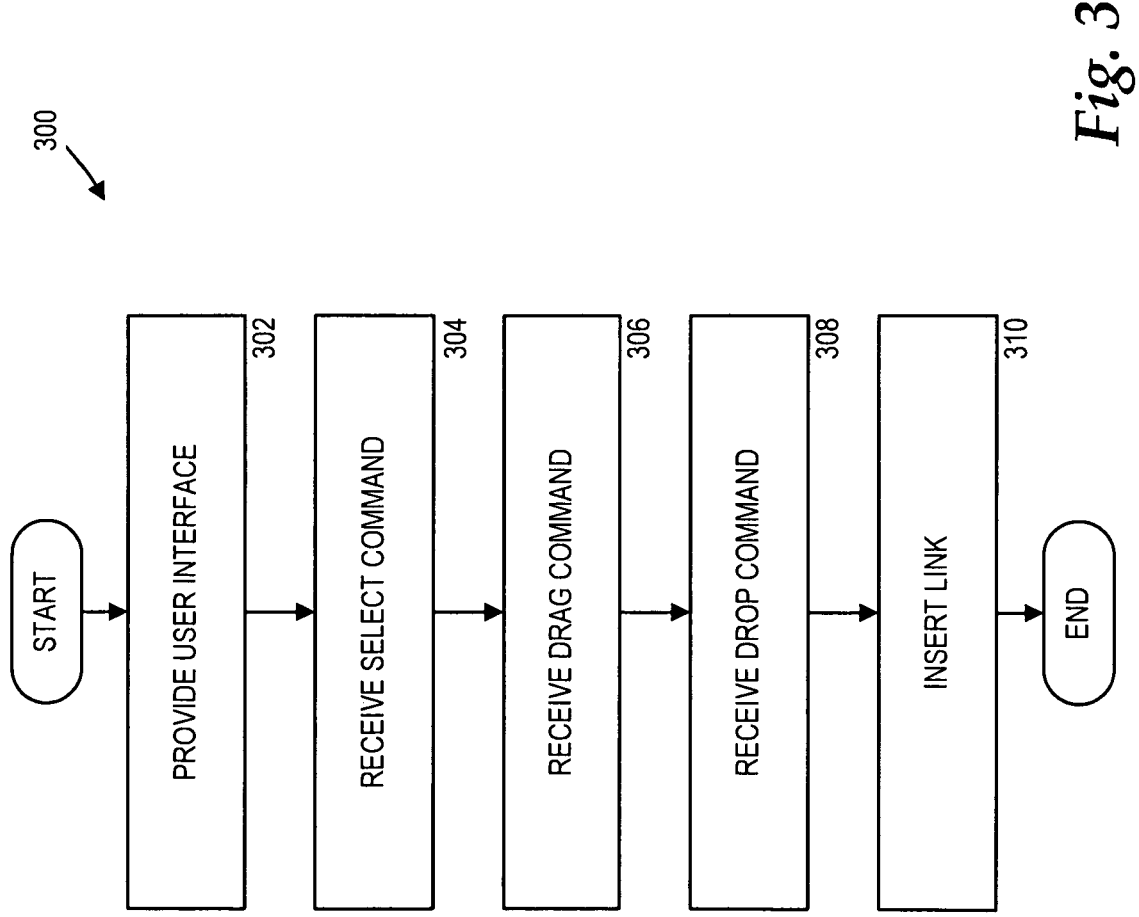
FIG. 3 is a flow diagram showing an illustrative process for creating and inserting links by drag and drop, in accordance with embodiments.

Referring now to FIG. 3, additional details will be provided regarding the embodiments presented herein creating and inserting links by drag and drop. In particular, FIG. 3 is a flow diagram illustrating one method for creating and inserting links by drag and drop. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

A routine 300 begins at operation 302, where a user interface is provided. The user interface may include a first portion, such as navigation pane 102, and a second portion, such as the edit pane 104. The first portion may include one or more listings corresponding to one or more entities. The second portion may include an editable surface for viewing and editing the entities. In one embodiment, each of the listings may be selected to cause the second portion to display the corresponding entity. Upon providing the user interface, the routine 300 proceeds to operation 304.

At operation 304, a select command is received from a user operating a mouse or other pointing device on the user interface. For example, depressing a left-button of a mouse on one of the listings may correspond to the select command. The user input created by the mouse may be monitored via JavaScript or other suitable computer code operating in the background of the user interface, as contemplated by those skilled in the art. Upon receiving the select command, the routine 300 proceeds to operation 306.

At operation 306, a drag command is received from the user operating the mouse or other pointing device on the user interface. For example, after selecting a listing by depressing a left-button of a mouse, a user may continue to hold down the left-button to initiate the drag command. The user may then move the mouse while holding down the left-button to "drag" the selected listing around the user interface.

In one embodiment, a dragging visualization may be provided in response to receiving the drag command. The dragging visualization may be a graphical representation of the selected listing. Further, in one embodiment, an insertion pointer may be provided in response to receiving the drag command. The insertion pointer may be a graphical representation of an insertion point for a link. The insertion point may be identified by coordinates identifying the position and movement of the user's mouse or other pointing device. Upon receiving the drag command, the routine 300 proceeds to operation 308.

At operation 308, a drop command is received from the user operating the mouse or other pointing device on the user interface. For example, after moving the mouse while holding down the left-button to "drag" the selected listing, the user may "drop" the selected listing within the document displayed in the second portion. The location where the user drops the selected listing may be precisely identified by the insertion pointer as previously described. It should be appreciated that the select command, the drag command, and the drop command may be collectively referred to as a drag and drop command. Upon receiving the drop command, the routine 300 proceeds to operation 310.

At operation 310, a link, such as a hyperlink, is inserted into the document displayed in the second portion. By inserting the link into an entity, the entity is transformed from a first state in which the entity does not contain the link into a second state in which the entity does contain the link. The link may be inserted at the location where the user drops the selected listing. In one embodiment, the link comprises anchor text and a URL. In another embodiment, the link comprises an image (e.g., a thumbnail image of a slide) and a URL. In yet another embodiment, the link comprises an internal link for traversing between sections within a single document. Once the link is inserted into the document, the document may be saved and/or transmitted according to the particular application program implementing the user interface.

Figure 4:
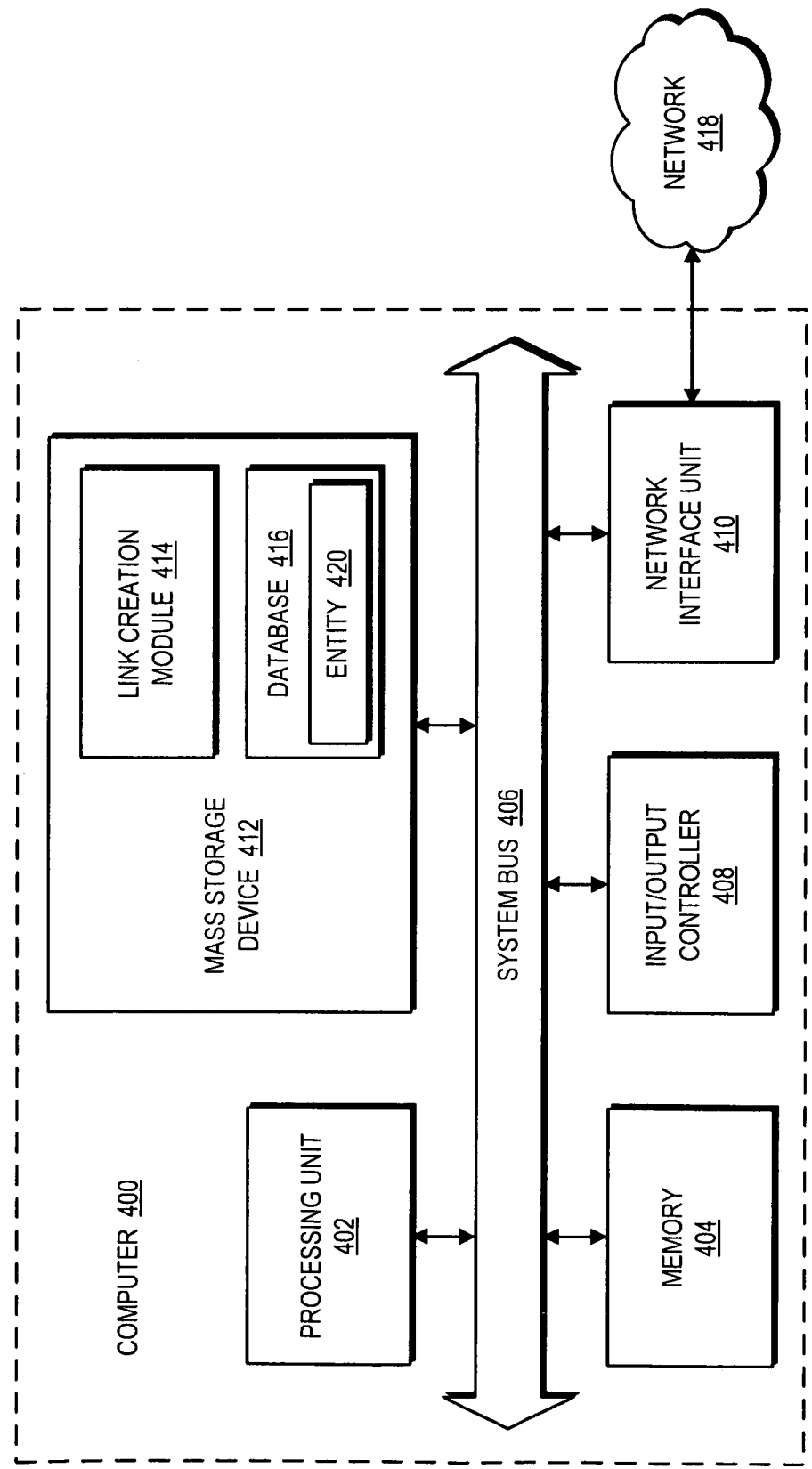
FIG. 4 is a computer architecture diagram showing an illustrative computer hardware architecture for a computing system capable of implementing the embodiments presented herein.

Referring now to FIG. 4, an exemplary computer architecture diagram showing a computer 400 is illustrated. The computer 400 includes a processing unit 402 ("CPU"), a system memory 404, and a system bus 406 that couples the memory 404 to the CPU 402. The computer 400 further includes a mass storage device 412 for storing one or more program modules, such as a link creation module 414, and one or more databases 416. According to embodiments, the routine 300 may be embodied in the link creation module 414 and executable by the computer 400. The databases 416 may be operative to store metadata containing information, such as anchor text, images, and URLs, used to create links. The databases 416 may also store entities, such as an entity 420. The metadata may or may not be attached to the corresponding entities. The mass storage device 412 is connected to the CPU 402 through a mass storage controller (not shown) connected to the bus 406. The mass storage device 412 and its associated computer-readable media provide non-volatile storage for the computer 400. Although the description of computer-readable media contained herein refers to a mass storage device, such as a hard disk or CD-ROM drive, it should be appreciated by those skilled in the art that computer-readable media can be any available computer storage media that can be accessed by the computer 400.

By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 400.

According to various embodiments, the computer 400 may operate in a networked environment using logical connections to remote computers through a network 418. The computer 400 may connect to the network 418 through a network interface unit 410 connected to the bus 406. It should be appreciated that the network interface unit 410 may also be utilized to connect to other types of networks and remote computer systems. The computer 400 may also include an input/output controller 408 for receiving and processing input from a number of input devices (not shown), including a keyboard, a mouse, a microphone, and a game controller. Similarly, the input/output controller 408 may provide output to a display or other type of output device (not shown).

Based on the foregoing, it should be appreciated that technologies for creating and inserting links by drag and drop are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for creating and inserting links, the method comprising computer-implemented operations for:
providing a user interface including a navigation pane and an edit pane,
the navigation pane configured to display a first listing and a second listing,
the first listing corresponding to a first entity,
the second listing corresponding to a second entity, distinct from the first entity,
the edit pane comprising an editable surface for viewing and editing the second entity when the second listing is selected by a user in the navigation pane, the edit pane adjacent to the navigation pane;
receiving a command to drag and drop the first listing from the navigation pane into the edit pane while the edit pane is displaying the second entity;
in response to receiving the command to drag and drop the first listing from the navigation pane into the edit pane while the edit pane is displaying the second entity, retrieving a link to the first entity corresponding to the first listing; and
upon retrieving the link to the first entity, inserting the link to the first entity into the second entity to transform the second entity from a first state without the link into a second state with the link.

2. The computer-implemented method of claim 1, wherein receiving the command to drag and drop the first listing from the navigation pane into the edit pane while the edit pane is displaying the second entity comprises:

receiving a select command by the user to select the first listing from the navigation pane;

upon receiving the select command, receiving a drag command by the user to drag the first listing from the navigation pane into the edit pane while the edit pane is displaying the second entity;

receiving a drop command by the user to drop the first listing into the second entity displayed in the edit pane; and wherein in response to receiving the command to drag and drop the first listing from the navigation pane into the edit pane while the edit pane is displaying the second entity, retrieving the link to the first entity corresponding to the first listing comprises in response to receiving the drop command to drop the first listing into the second entity, retrieving the link to the first entity corresponding to the first listing as selected by the select command.

3. The computer-implemented method of claim 1, wherein receiving the command to drag and drop the first listing from the navigation pane into the edit pane while the edit pane is displaying the second entity comprises:

receiving a select command by the user to select the first listing from the navigation pane;

upon receiving the select command, receiving a drag command by the user to drag the first listing from the navigation pane into the edit pane;

in response to receiving the drag command, providing a dragging visualization corresponding to the first listing within the user interface, the dragging visualization comprising a graphical representation of the drag command;

receiving a drop command by the user to drop the first listing into the second entity displayed in the edit pane; and wherein in response to receiving the command to drag and drop the first listing from the navigation pane into the edit pane while the edit pane is displaying the second entity, retrieving the link to the first entity corresponding to the first listing comprises in response to receiving the drop command to drop the first listing into the second entity, retrieving the link to the first entity corresponding to the first listing as selected by the select command.

4. The computer-implemented method of claim 1, wherein receiving the command to drag and drop the first listing from the navigation pane into the edit pane while the edit pane is displaying the second entity comprises:

receiving a select command by the user to select the first listing from the navigation pane;

upon receiving the select command, receiving a drag command by the user to drag the first listing from the navigation pane into the edit pane;

in response to receiving the drag command, providing an insertion pointer within the edit pane, the insertion pointer comprising a graphical representation of an insertion point for the link;

receiving a drop command by the user to drop the first listing into the second entity displayed in the edit pane; and wherein in response to receiving the command to drag and drop the first listing from the navigation pane into the edit pane while the edit pane is displaying the second entity, retrieving the link to the first entity corresponding to the first listing comprises in response to receiving the drop command to drop the listing into the second entity, retrieving the link to the first entity corresponding to the first listing as selected by the select command.

5. The computer-implemented method of claim 1, wherein inserting the link to the first entity into the second entity comprises inserting the link to the first entity into the second entity at a location where the first listing is dropped.

6. The computer-implemented method of claim 1, wherein the link comprises anchor text and a uniform resource locator (URL) corresponding to the first entity.

7. The computer-implemented method of claim 1, wherein the link comprises a thumbnail image of the first entity and a uniform resource locator (URL) corresponding to the first entity.

8. The computer-implemented method of claim 7, wherein the first entity and the second entity comprise separate documents.

9. The computer-implemented method of claim 1, wherein retrieving a link to the first entity corresponding to the first listing comprises retrieving metadata associated with the first entity; and
retrieving the link stored in the metadata.

10. The computer-implemented method of claim 1, wherein the navigation pane is further configured to display a third listing and a fourth listing, the third listing corresponding to a first section of a third entity, the fourth listing corresponding to a second section of the third entity, and the edit pane comprising the editable surface for viewing and editing the second section of the third entity when the fourth listing is selected by the user in the navigation pane; and wherein the method further comprises computer-implemented operations for:

receiving a second command to drag and drop the third listing from the navigation pane into the edit pane while the edit pane is displaying the second section of the third entity;

in response to receiving the second command to drag and drop the third listing from the navigation pane into the edit pane while the edit pane is displaying the second section of the third entity, retrieving a second link to the first section of the third entity; and upon retrieving the second link to the first section of the third entity, inserting the second link to the first section of the third entity into the second section of the third entity.

11. The computer-implemented method of claim 10, wherein the third entity comprises a word processing document; and wherein the first section and the second section comprise sections within the word processing document.

12. A computer system comprising:

a processor;

a memory operatively coupled to the processor; and a program module (i) which executes in the processor from the memory and (ii) which, when executed by the processor, causes the computer system to create and insert links by providing a user interface including a navigation pane and an edit pane, the navigation pane configured to display a first listing and a second listing, the first listing corresponding to a first entity, the second listing corresponding to a second entity, distinct from the first entity, the edit pane comprising an editable surface for viewing and editing the second entity when the second listing is selected by a user in the navigation pane, the edit pane adjacent to the navigation pane, receiving a select command by the user to select the first listing from the navigation pane, upon receiving the select command, receiving a drag command by the user to drag the first listing from the navigation pane displaying the first listing into the edit pane displaying the second entity, receiving a drop command by the user to drop the first listing into the second entity displayed in the edit pane, in response to receiving the drop command to drop the listing into the second entity, retrieving a link to the first entity corresponding to the first listing; and upon retrieving the link to the first entity, inserting the link to the first entity into the second entity.

13. The computer system of claim 12, wherein the first entity and the second entity comprise pages for a note-taking application program.

14. The computer system of claim 12, wherein the first entity and the second entity comprise slides for a presentation application program.

15. The computer system of claim 12, wherein the program module, when executed by the processor, further causes the computer system to create and insert links by:

in response to receiving the drag command, providing a dragging visualization corresponding to the first listing within the user interface, the dragging visualization comprising a graphical representation of the drag command, and further providing an insertion pointer within the edit pane, the insertion pointer comprising a graphical representation of an insertion point for the link.

16. The computer system of claim 12, wherein the link comprises a hyperlink.

17. The computer system of claim 12, wherein inserting the link to the first entity into the second entity comprises inserting the link to the first entity into the second entity at a location where the first listing is dropped.

18. A computer-readable medium not being a signal and having computer-executable instructions stored thereon which, when executed by a computer, cause the computer to:

provide a user interface including a navigation pane and an edit pane, the navigation pane configured to display a first listing and a second listing, the first listing corresponding to a first entity, the second listing corresponding to a second entity, distinct from the first entity, the edit pane comprising an editable surface for viewing and editing the second entity when the second listing is selected by a user in the navigation pane, the edit pane adjacent to the navigation pane;

receive a select command by the user to select the first listing from the navigation pane;

upon receiving the select command, receive a drag command by the user to drag the listing from the navigation pane displaying the first listing into the edit pane displaying the second entity;

in response to receiving the drag command, provide a dragging visualization corresponding to the first listing within the user interface, the dragging visualization comprising a graphical representation of the drag command, and further provide an insertion pointer within the edit pane, the insertion pointer comprising a graphical representation of an insertion point for a link to the first entity;

receive a drop command by the user to drop the first listing into the second entity displayed in the edit pane; and in response to receiving the drop command to drop the listing into the second entity, retrieve the link to the first entity corresponding to the first listing; and upon retrieving the link to the first entity, insert the link to the first entity into the second entity at a location where the first listing is dropped.

19. The computer-readable medium of claim 18, wherein the link comprises predefined anchor text or an image representation retrieved from metadata associated with the first entity.

* * * * *